US012448158B2

(12) United States Patent
Eleryan et al.

(10) Patent No.: US 12,448,158 B2
(45) Date of Patent: Oct. 21, 2025

(54) UNMANNED VEHICLE WITH MULTIPLE TRANSPORTATION MODES

(71) Applicant: CLEO ROBOTICS INC., Boston, MA (US)

(72) Inventors: Omar Eleryan, Boston, MA (US); Szymon Czarnota, Boston, MA (US)

(73) Assignee: CLEO ROBOTICS INC., Boston, MA (US)

( * ) Notice: Subject to any disclaimer, the term of this patent is extended or adjusted under 35 U.S.C. 154(b) by 0 days.

(21) Appl. No.: 18/370,182

(22) Filed: Sep. 19, 2023

(65) Prior Publication Data

US 2024/0239530 A1 Jul. 18, 2024

Related U.S. Application Data

(60) Provisional application No. 63/522,261, filed on Jun. 21, 2023, provisional application No. 63/407,999, filed on Sep. 19, 2022.

(51) Int. Cl.
*B64U 50/14* (2023.01)
*B64C 29/00* (2006.01)

(52) U.S. Cl.
CPC .......... *B64U 50/14* (2023.01); *B64C 29/0033* (2013.01)

(58) Field of Classification Search
CPC ..... B64C 7/02; B64C 11/001; B64C 29/0033; B64C 39/062; B64C 39/064; B64U 10/13;
(Continued)

(56) References Cited

U.S. PATENT DOCUMENTS 5,295,643 A * 3/1994 Ebbert .................. B64U 10/13
428/117
6,450,445 B1 * 9/2002 Moller .................. B64U 50/14
244/12.6
(Continued)

FOREIGN PATENT DOCUMENTS

CN 107933891 A * 4/2018 ............. B64C 11/00

OTHER PUBLICATIONS

International Search Report and The Written Opinion for International application No. PCT/US2023/033129 dated Dec. 13, 2023 (10 pages).

*Primary Examiner* — Joshua E Rodden
(74) *Attorney, Agent, or Firm* — Polsinelli PC

(57) ABSTRACT

Systems, methods, and device include a vehicle for providing horizontal directional control in a first transportation mode and a second transportation mode. The vehicle is an unmanned aerial vehicle with the duct defining a ducted air pathway with a central axis. One or more propellor(s) are arranged to move air through the ducted air pathway. One or more flap(s) are movable between multiple positions that vary a distance between ends of the flap(s) and the central axis. The first transportation mode includes three-dimensional control by the propellor(s) and flap(s), and the second transportation mode includes two-dimensional control with the control by the propellor(s) and flap(s). The three-dimensional control includes a first flap position that corresponds to a forward direction and the two-dimensional control includes a second flap position that corresponds to the forward direction, the second flap position being an opposite position relative to the first flap position.

19 Claims, 8 Drawing Sheets

(58) Field of Classification Search
CPC ...... B64U 30/299; B64U 50/13; B64U 50/14; B64U 60/50; B64U 60/55
USPC ...................................................... 244/23 R
See application file for complete search history.

(56) References Cited

U.S. PATENT DOCUMENTS

| | | | | |
|---|---|---|---|---|
| 6,691,949 B2* | 2/2004 | Plump | .................... | B64U 30/26 244/34 A |
| 7,032,861 B2* | 4/2006 | Sanders, Jr. | ............ | B64C 27/12 244/12.1 |
| 7,631,834 B1* | 12/2009 | Johnson | ................. | B64U 50/14 244/175 |
| 7,712,701 B1* | 5/2010 | Ehrmantraut | .......... | B64U 50/19 244/17.23 |
| 8,348,190 B2* | 1/2013 | Fleming | ................. | B64U 30/24 244/23 D |
| 8,387,911 B2* | 3/2013 | Collette | ................. | B64U 50/12 244/7 B |
| 8,590,829 B2* | 11/2013 | Keidar | ................. | G05D 1/0866 244/17.11 |
| 8,820,672 B2* | 9/2014 | Erben | ................. | G01N 1/2273 244/23 C |
| 9,045,227 B1* | 6/2015 | Gramling | ................. | B64C 15/02 |
| 9,162,764 B2* | 10/2015 | Babinsky | ............. | B64C 39/064 |
| 9,412,278 B1* | 8/2016 | Gong | ................... | G08G 5/0013 |
| 9,975,633 B1* | 5/2018 | Johnson | ................ | B64C 11/001 |
| 10,579,074 B2* | 3/2020 | Ahn | ....................... | B64U 30/26 |
| 10,933,991 B2* | 3/2021 | Cottrell | ................... | B64C 27/08 |
| 12,037,118 B2* | 7/2024 | Melcher | .................. | B64C 29/02 |
| 2011/0180671 A1* | 7/2011 | Campbell | ............. | B64C 27/20 244/23 D |
| 2015/0344136 A1* | 12/2015 | Dahlstrom | ............. | B64U 50/19 239/722 |
| 2016/0152338 A1* | 6/2016 | Schlunke | ................ | B60V 1/046 244/23 R |
| 2019/0100296 A1 | 4/2019 | Aldana López et al. | | |
| 2019/0185161 A1* | 6/2019 | Eleryan | .................... | G05D 1/46 |
| 2022/0242182 A1 | 8/2022 | Karadia | | |

* cited by examiner

POSITIONING FIRST ONE OR MORE FLAPS AT A FIRST FLAP DISTANCE RELATIVE TO A CENTRAL AXIS OF A DUCTED AIR PATHWAY OF A VEHICLE, THE FIRST FLAP DISTANCE CORRESPONDING TO AN AERIAL TRANSPORTATION MODE SUCH THAT A FIRST THRUST IS GENERATED IN A FIRST DIRECTION BY THE FIRST ONE OR MORE FLAPS WHEN THE VEHICLE IS IN THE AERIAL TRANSPORTATION MODE

↓

TRANSITIONING BETWEEN THE AERIAL TRANSPORTATION MODE AND A GROUND TRANSPORTATION MODE

↓

POSITIONING SECOND ONE OR MORE FLAPS AT A SECOND FLAP DISTANCE RELATIVE TO THE CENTRAL AXIS OF THE DUCTED AIR PATHWAY, THE SECOND FLAP DISTANCE CORRESPONDING TO THE GROUND TRANSPORTATION MODE SUCH THAT A SECOND THRUST IS GENERATED IN A SECOND DIRECTION BY THE SECOND ONE OR MORE FLAPS WHEN THE VEHICLE IS IN THE GROUND TRANSPORTATION MODE

*FIG. 7*

UNMANNED VEHICLE WITH MULTIPLE TRANSPORTATION MODES

CROSS-REFERENCE TO RELATED APPLICATION

This application claims priority to U.S. Provisional Application Ser. No. 63/407,999 filed Sep. 19, 2022 and titled "UNMANNED VEHICLE WITH MULTIPLE TRANSPORTATION MODES;" and U.S. Provisional Application Ser. No. 63/522,261 filed Jun. 21, 2023 and titled "UNMANNED VEHICLE WITH MULTIPLE TRANSPORTATION MODES." Each of these applications is incorporated by reference in its entirety herein.

BACKGROUND

Ground vehicles (GV) and aerial vehicles (AV) typically have distinct configurations. Unlike GVs, which struggle to traverse difficult terrain or travel over large objects, AVs are not typically impeded by obstacles because they can fly over the obstacles. Further, GVs often have a limited field of view due to such obstacles and terrain, while AVs offer a bird's eye view from a different vantage point. On the other hand, AVs typically use more energy to stay airborne, thus limiting their operational time relative to GVs.

It is with these observations in mind, among others, that various aspects of the present inventive concept were conceived and developed.

BRIEF SUMMARY

The aforementioned problems can be addressed using the systems, methods, and devices disclosed herein. For instance, a vehicle can include a duct connected to a chassis and defining a ducted air pathway with a central axis; one or more propellers arranged in the chassis to move air through the ducted air pathway; and/or one or more flaps disposed around a bottom portion of the ducted air pathway movable between multiple positions that vary a distance between one or more termination ends of the one or more flaps and the central axis, the one or more flaps providing horizontal directional control for the vehicle in: a first transportation mode; and a second transportation mode.

In some examples, the first transportation mode is a flight mode and the second transportation mode is a ground mode. Additionally, the first transportation mode can include three-dimensional control by the one or more propellers and the one or more flaps; and/or the second transportation mode includes two-dimensional control by the one or more propellers and the one or more flaps. The three-dimensional control can also include a first flap position that correspond to a forward direction, and/or the two-dimensional control can include a second flap position that corresponds to the forward direction, the second flap position being an opposite position relative to the first flap position for the three-dimensional control. The forward direction can be a same forward direction for the first transportation mode (e.g., using the three-dimensional control) and the second transportation mode (e.g., using the two-dimensional control).

In some scenarios, the vehicle includes one or more wheels arranged around the bottom portion of the chassis for providing horizontal ground or surface mobility in the second transportation mode. The one or more flaps can include a first flap, a second flap, a third flap, and a fourth flap. Furthermore, the first flap, the second flap, the third flap, and the fourth flap can be evenly spaced 90° apart around the chassis. Additionally or alternatively, the vehicle can further comprise one or more processors; and/or a storage device storing computer-readable instructions that, when executed by the one or more processors, cause the vehicle to move the first flap and the second flap toward the central axis to generate a first thrust having a component in a horizontal direction; transition between the first transportation mode and the second transportation mode; and/or move the third flap and the fourth flap toward the central axis to generate a second thrust with the component in the horizontal direction. The computer-readable instructions, when executed by the one or more processors, can additionally cause the vehicle to retract the first flap and the second flap away from the central axis to generate the second thrust with the component in the horizontal direction. Moreover, generating the second thrust can be responsive to determining a location of a charging station associated with the vehicle.

In some examples, a method of controlling a vehicle comprises positioning first one or more flaps at a first flap distance relative to a central axis of a ducted air pathway of the vehicle, the first flap distance corresponding to an aerial transportation mode such that a first thrust is generated in a first direction by the first one or more flaps when the vehicle is in the aerial transportation mode; transitioning between the aerial transportation mode and a ground transportation mode; and/or positioning second one or more flaps at a second flap distance relative to the central axis of the ducted air pathway, the second flap distance corresponding to the ground transportation mode such that a second thrust is generated in a second direction by the second one or more flaps when the vehicle is in the ground transportation mode.

In some scenarios, the first direction is a same direction as the second direction; the first flap distance is part of a first arrangement of four flaps; and/or the second flap distance is part of a second arrangement of the four flaps that is an inverted configuration relative to the first arrangement of the four flaps.

In some instances, a vehicle having multiple transportation modes includes: a duct connected defining a ducted air pathway with a central axis; one or more propellers arranged to move air through the ducted air pathway; a bottom chassis portion; and/or one or more flaps extending from the bottom chassis portion. The one or more flaps can be movable between multiple positions that vary an angle formed by the one or more flaps, the one or more flaps providing horizontal directional control for the vehicle in: a first transportation mode; and a second transportation mode.

In some examples, the one or more flaps includes four flaps form a cross pattern with a center space. Additionally, the vehicle can comprise one or more wheels coupled to the bottom chassis portion. Moreover, the first transportation mode can be an aerial mode using the one or more flaps for horizontal navigation control; and the second transportation mode can be a ground mode using the one or more flaps and the one or more wheels for the horizontal navigation control. The one or more wheels can elevate the vehicle from a ground surface when the vehicle is in the second transportation mode such that a gap is formed between the bottom chassis portion and the ground surface. Additionally, the gap can have a vertical distance; and the one or more flaps can extend downward a distance that is less than the vertical distance of the gap. The one or more flaps can also be rotatably coupled to the bottom chassis portion.

The foregoing summary is intended to be illustrative and is not meant in a limiting sense. Many features of the embodiments may be employed with or without reference to other features of any of the embodiments. Additional aspects, advantages, and/or utilities of the presently disclosed technology will be set forth in part in the description that follows and, in part, will be apparent from the description, or may be learned by practice of the presently disclosed technology.

BRIEF DESCRIPTION OF THE DRAWINGS

FIG. 7 illustrates a block diagram of an example method for controlling a vehicle.

DETAILED DESCRIPTION

The systems, methods, and devices disclosed herein include an unmanned vehicle (or hybrid vehicle) configured to transition between and operate in different transportation modes, such as a ground mode and an aerial mode. The vehicle includes a control system and one or more steering flaps configured to control movement in the different transportation modes. There are many applications where the vehicle can be airborne, operate on the ground, and/or transition between modes to operate in both spaces. For example, when operating indoors or other settings the vehicle may advantageously drive on flat surfaces and fly over obstacles and staircases. The vehicle may transition to a ground mobility transportation mode when inspecting intricate duct works and piping that are difficult to access and don't allow for stable flight due to the recirculated air from the propellers that cause turbulence. The ability to navigate in different transportation modes (e.g., an aerial transportation and a ground/surface transportation mode) can be useful when precision landing is required (e.g., on a charging station), so the AV can land near the charging station and then can drive to ensure precise final positioning. The vehicle can include features to perform various methods to switch between flight and operation on the ground or flat surfaces without the need for any additional motors. In both transportation modes, the vehicle can use the aerial thrust vectoring capability of one or more propellers and/or one or more steering flaps that can be moved into or away from a ducted airway of the propellers. These ducted aerial vehicles (AV) can use one or more propellers housed inside a duct (e.g., a flared duct) and driven by at least one motor, and a combination of control surfaces (flaps) close to or below the bottom of the duct. Control surfaces can be coupled with motors or actuators to redirect airflow to control pitch, roll and in some cases, yaw as well. The same control systems can be used for ground steering and control after the vehicle has landed on the ground or before taking off for aerial transportation. This disclosure describes a method that allows any ducted AV to use thrust vectoring to drive the vehicle on the ground or relatively flat surfaces when outfitted with wheels or mechanisms that reduce ground friction.

Figure 1:
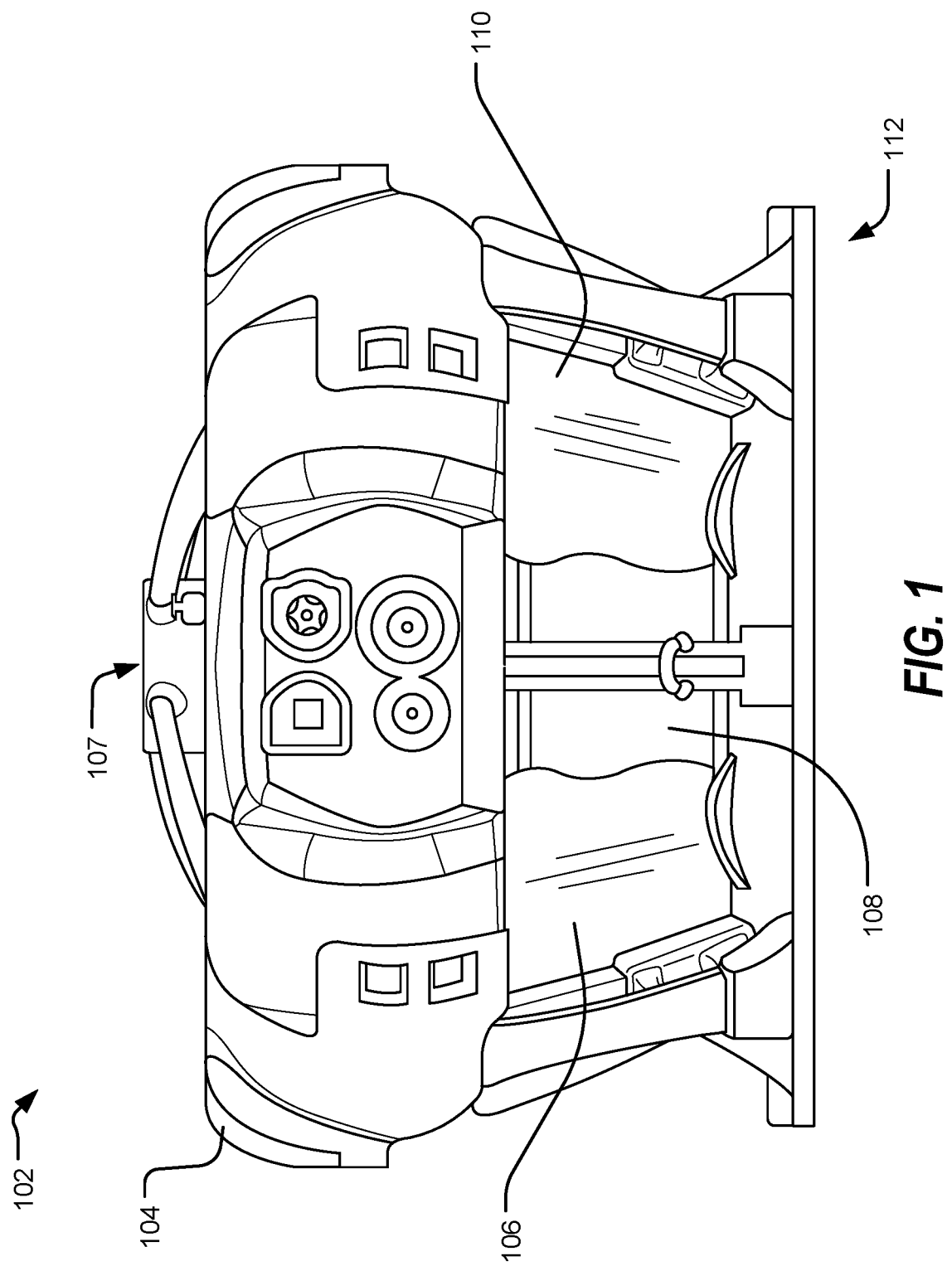
FIG. 1 illustrates a front elevation view of an example system including a vehicle configured to transition between and operate in a plurality of transportation modes.

FIG. 1 illustrates an example of a vehicle 102 (e.g., an unmanned vehicle), such as a ducted AV 104, that can be configured to transition between and operate in a plurality of transportation modes. In one example, the ducted AV 104 uses four retractable control surfaces 106 and 2 coaxial counter-rotating propellers 105 to control movement in a plurality of different mediums and spaces (e.g., terrestrial and aerial). The four control surfaces 106 can be slid in and out of an air pathway 107 defined by a duct 108, redirecting air to generate forces and moments that cause a motion, a rotation or both. To achieve yaw control, the speed of one or more propellers 105 can be varied.

Figure 2A:
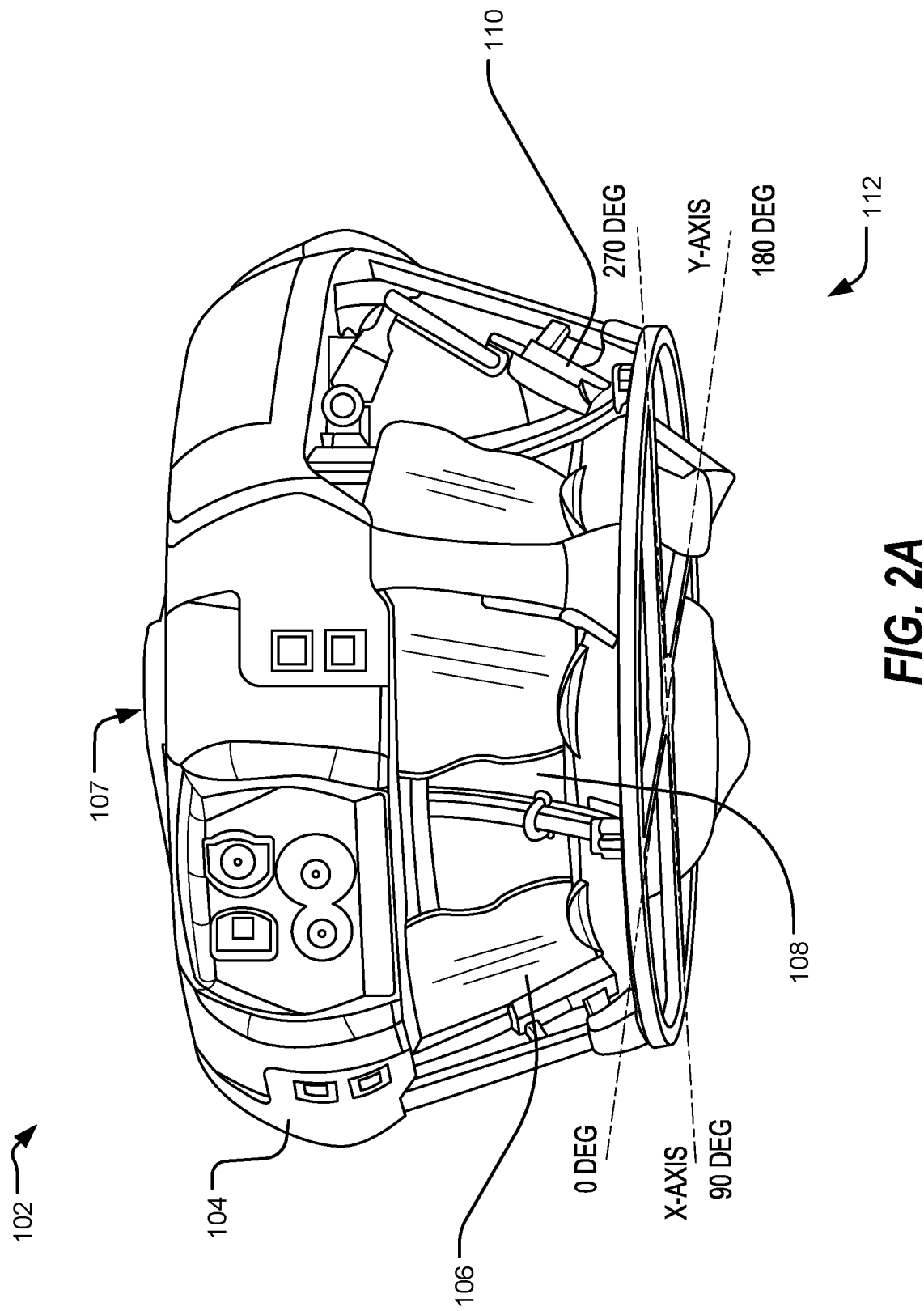
FIGS. 2A and 2B illustrate a perspective view and a perspective exploded view, respectively, of an example system including a vehicle with one or more steering flaps.
Figure 2B:
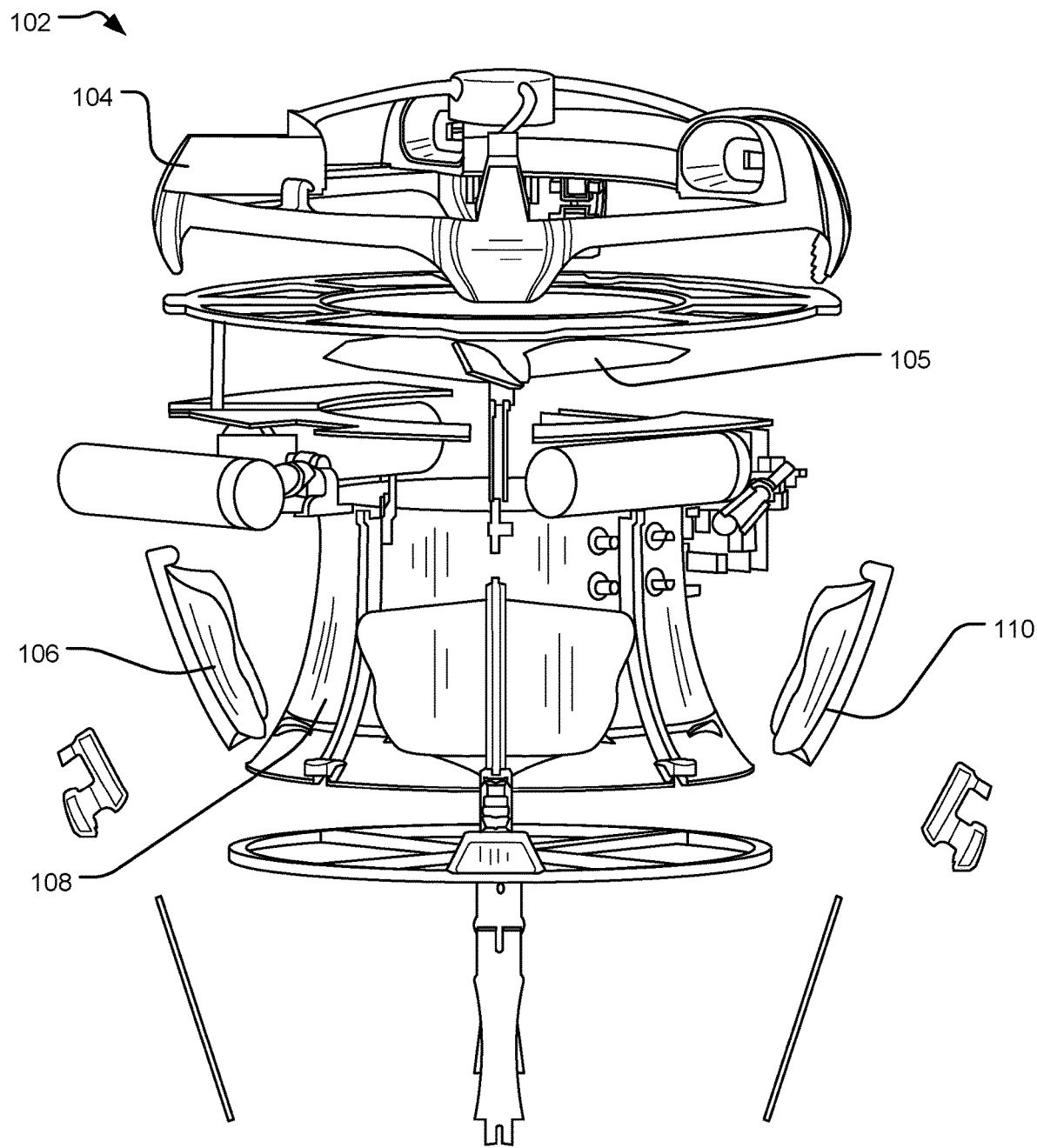

FIGS. 2A and 2B illustrate an example of the ducted AV 104 of FIG. 1 in perspective and exploded views, respectively. FIGS. 2A and 2B show how a plurality of flaps 110 (e.g., steering flaps) can be arranged around a central duct 108 of the vehicle 102. For instance, four flaps 110 can extend around a circular duct 108 with linkage guides for slidably mounting the flaps 110 to a bottom frame of the chassis. In some instances, 360° of horizontal directional control is maintained by adjusting between insertion profiles of the steering flaps 110 while providing propeller thrust, causing the vehicle 102 to move in a desired direction. This control system can be used in an aerial transportation mode 112 (e.g., with three degrees of freedom) and a ground or surface or ground transportation mode 114 (e.g., with two degrees of freedom)

Figure 3:
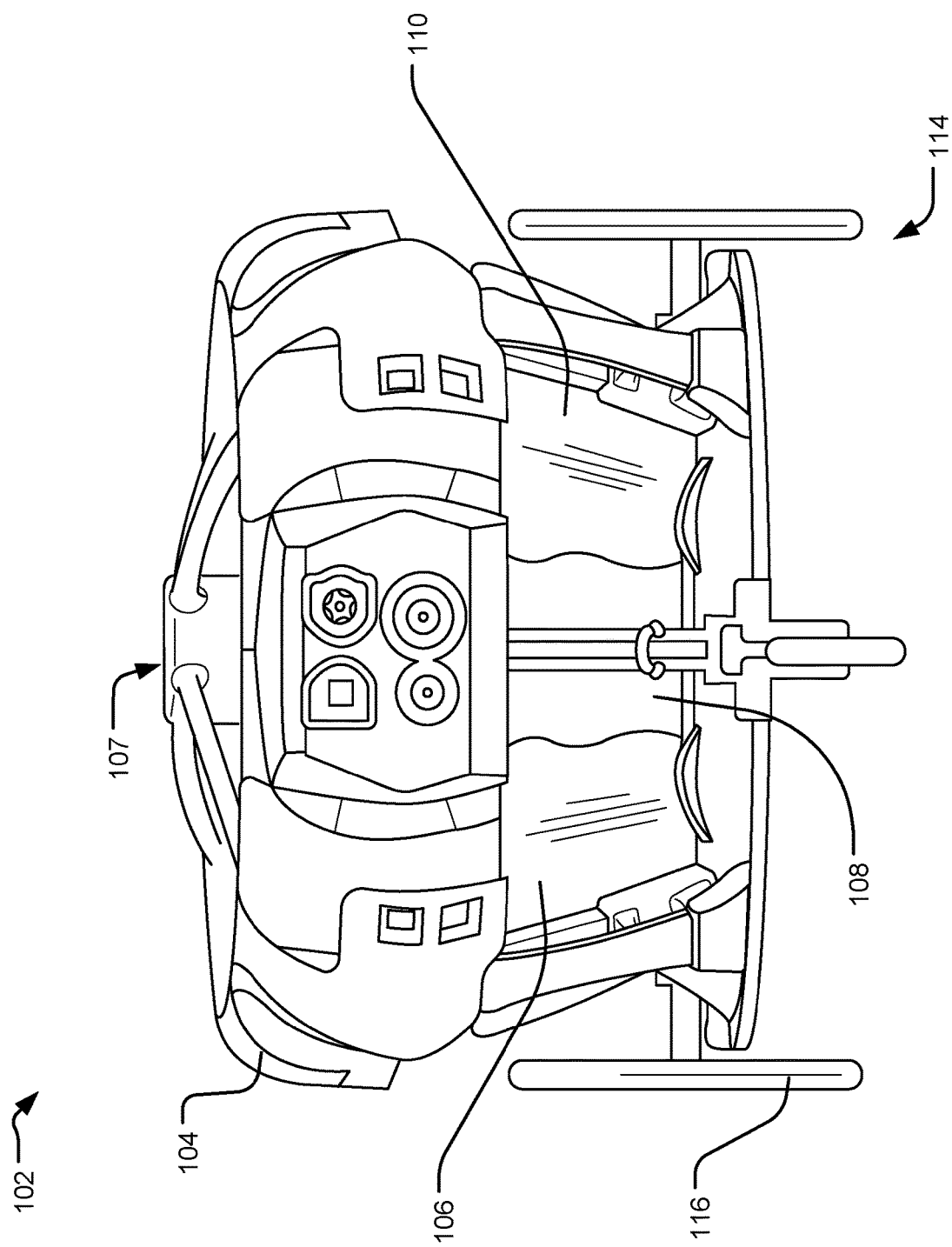
FIG. 3 illustrates a front perspective view of an example system including a vehicle including one or more wheels.

FIG. 3 illustrates an example ducted AV 104 with features that can be included in any of the examples disclosed herein. As depicted in FIG. 3, one or more wheels 116 can be coupled to the AV. The one or more wheels can include two wheels in the rear and one wheel in the front, to facilitate ground movement and can provide a capability to operate in a plurality of transportation modes including an AV mode 112 and a ground vehicle (GV) mode 114. In other versions, there could be four wheels, with two in the rear and two in the front. It is also possible to position the wheels in a way that the AV leans towards the front or the rear to aid travel towards the front or the rear respectively. Omnidirectional wheels are also possible to ensure movement in any direction and easier rotation around the vertical axis (perpendicular to the ground). Other versions could have steerable front wheels or wheels that are free to rotate to facilitate rotation around the vertical axis. The vertical axis can be perpendicular to the plane of travel while the ducted AV 104 is in GV mode 114. In some versions, only two wheels may be used and the flaps 110 can maintain balance and control movement. Several other mechanisms can be used to ensure the reduction of ground friction to allow the vehicle 102 to move easily on flat surfaces, including and without limitation, omnidirectional wheels and/or low friction pads. Any of these mechanisms, including wheels, can be permanently fixed, detachable, retractable, and/or the like. In some cases, these mechanisms can be motorized to allow for the remote deployment or retraction of the wheels or pads (similar to landing gear on aircraft), and/or manually where a person deploys or retract them. The wheels can also be detachable via a mechanical magnetic lock. The wheels can also be outfitted with mechanisms that allow for braking to allow for faster stopping and prevent the GV from unintended movement. In some cases, the wheels could also be retracted to avoid unintended movement or to reduce aerodynamic drag while in the flight mode. Once the AV has landed within a predetermined proximity of a destination location, the wheels and flap navigation system can be used to navigate the AV to the destination location, such as a charging dock, other power source, or data upload location. Additionally or alternatively, the AV can include other ground-contact mechanisms, such as a tread, track attachment, rollers, a low-friction sliding surface, combinations thereof, and the like.

In both ground vehicle (GV) 114 and AV modes 112, the flaps 110 may be used for vectoring the thrust by redirecting the air exiting the duct 108 to any desired direction along the circumference of the duct outlet and as a result control the vehicle 102. To determine which flaps 110 to deploy and the amount of each flap insertion, the following formula can be used:

Flap insertion can be governed (e.g., controlled) by the following formula:

$$I_x = \gamma * F_x(\alpha) + i_{start} \text{ where } F_x(\alpha) = F(\alpha + \delta_x)$$

Where: x can be the flap index; $I_x$ can be the amount of flap insertion for flap x; y can be the magnitude of control as calculated by a control algorithm which can take into account sensor measurements and desired position, angles, acceleration, velocities, etc.; $\alpha$ can be the angle corresponding to the direction of the desired thrust vector; $\delta_x$ can be the angle offset of each flap from the forward direction of travel of the vehicle 102 (along 0 degrees as shown in FIG. 2A); $F(\alpha+\delta_x)$ can be the relative flap insertion required to generate a thrust vector in direction $\alpha$; $i_{start}$ can be the starting flap insertion between 0 and 1. In some cases, it may be useful for the flaps 110 to start at a non-zero value. This could be in cases where small flap insertions don't result in any meaningful vectoring of thrust. In such cases the $i_{start}$ parameter may enable the flaps 110 located in the direction opposite $\alpha$ to retract.

The plurality of flaps 110 can each use the same function F. In doing so, the relative location of each flap in the AV can be taken into account. For controlling the vehicle 102 (e.g., the vehicle 102 depicted in FIG. 2A), the following offsets can be used for four flaps 110:

| x | $\delta_x$(deg) |
|---|---|
| 1 | −45 |
| 2 | 45 |
| 3 | 135 |
| 4 | −135 |

Figure 4A:
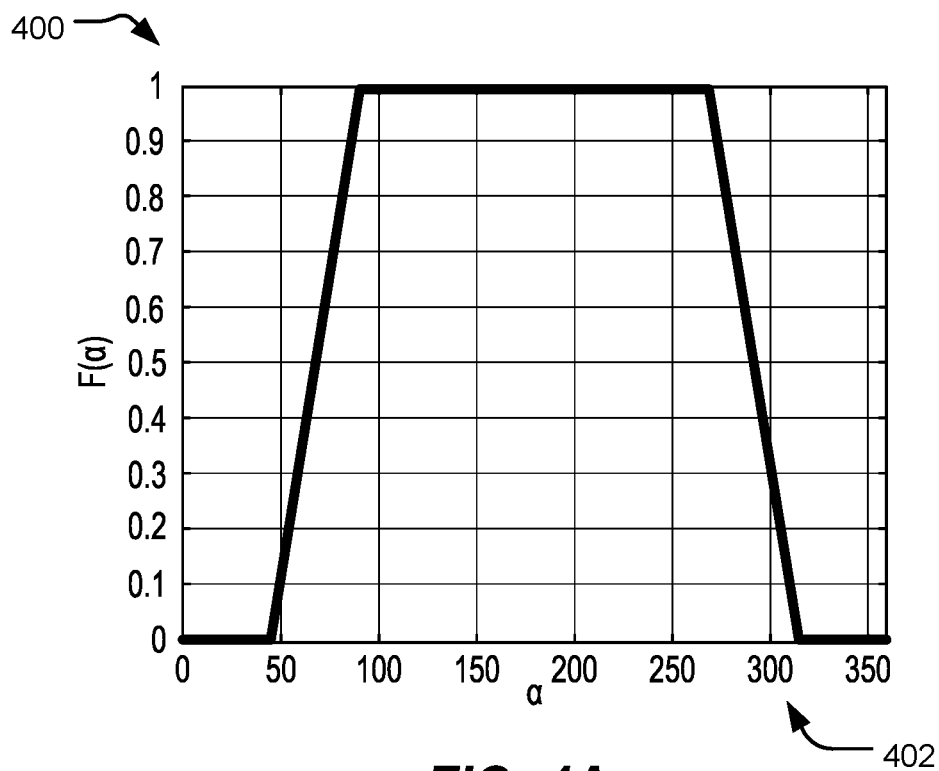
FIGS. 4A-4C illustrate example flap insertion functions for controlling a vehicle with one or more steering flaps.
Figure 4B:
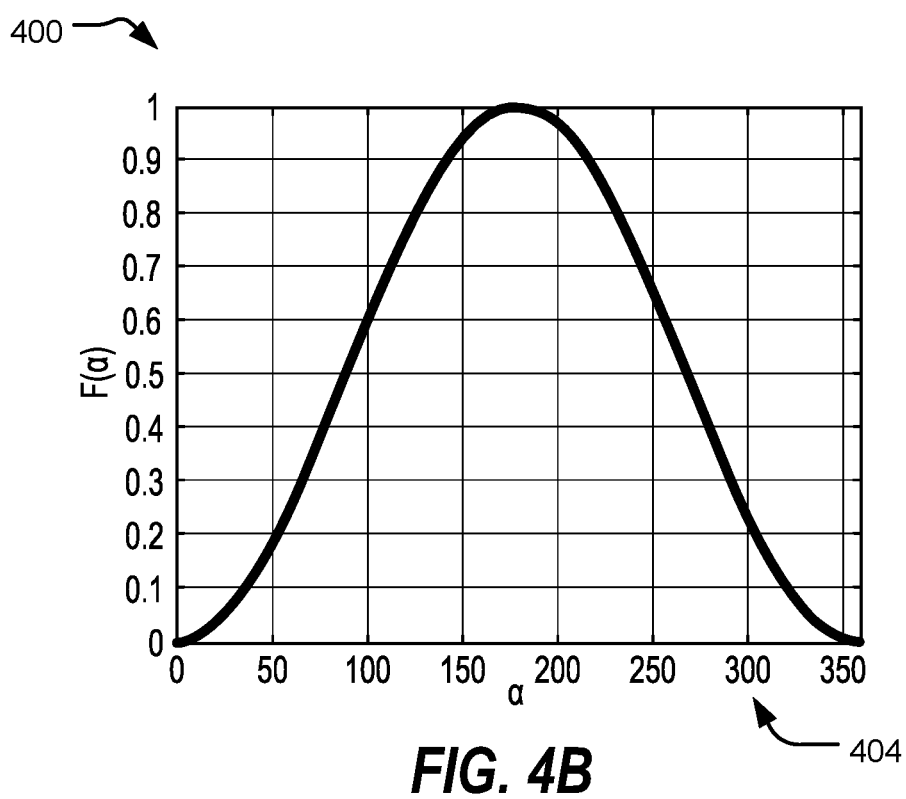
Figure 4C:
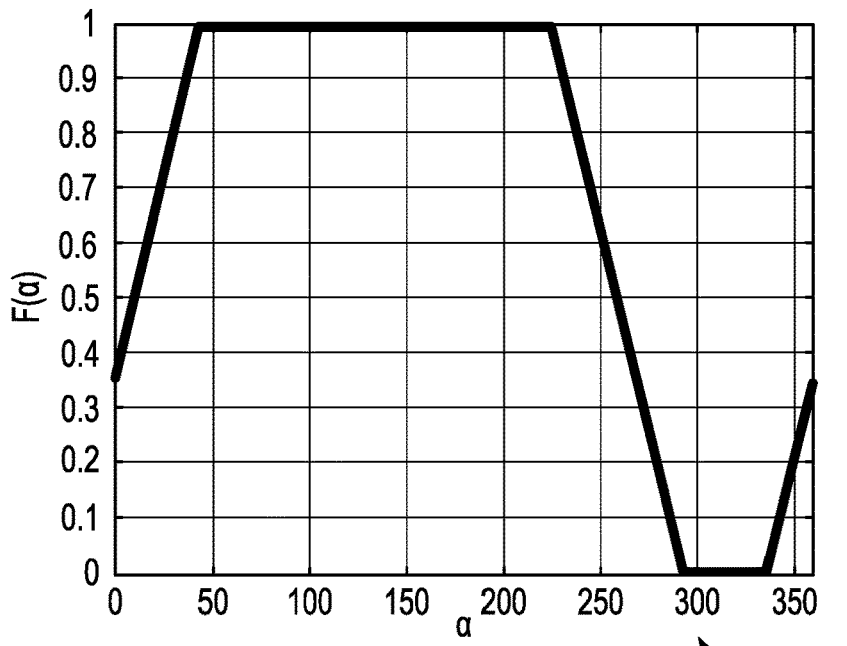

FIGS. 4A-4C illustrate example flap insertion functions 400 for controlling the ducted AV 104. FIG. 4A depicts an example of a function F($\alpha$) with linear sections 402. FIG. 4B depicts an example of a substantially non-linear function F($\alpha$) 404. FIG. 4C depicts an example of function F($\alpha+\delta_x$) where $\delta_x$=45° and $i_{start}$=0.35 406.

FIGS. 4A and 4B show two examples of the function F($\alpha+\delta_x$) where $\delta_x$=0 to determine the relative amount of flap insertion to correspond to a thrust vector in a certain direction. The x axis shows the desired angle for the direction of the thrust vector in degrees from 0° to 360°. The y axis determines the contribution for each flap.

FIG. 4B depicts an example of a non-linear function 404 instead of the straight lines in FIG. 4A to maximize control over certain regimens of the airflow and account for the effects of having more than one flap deployed at certain points. In some iterations, the flaps 110 may start at a nonzero position, for example when the thrust vector amount is not substantial enough at small flap insertions. In such cases, the flaps 110 may still fully retract to the zero position but only after an opposite flap is fully retracted as demonstrated in FIG. 4C. These techniques can provide more precise control in a desired direction along the x and y axes.

Figure 5:
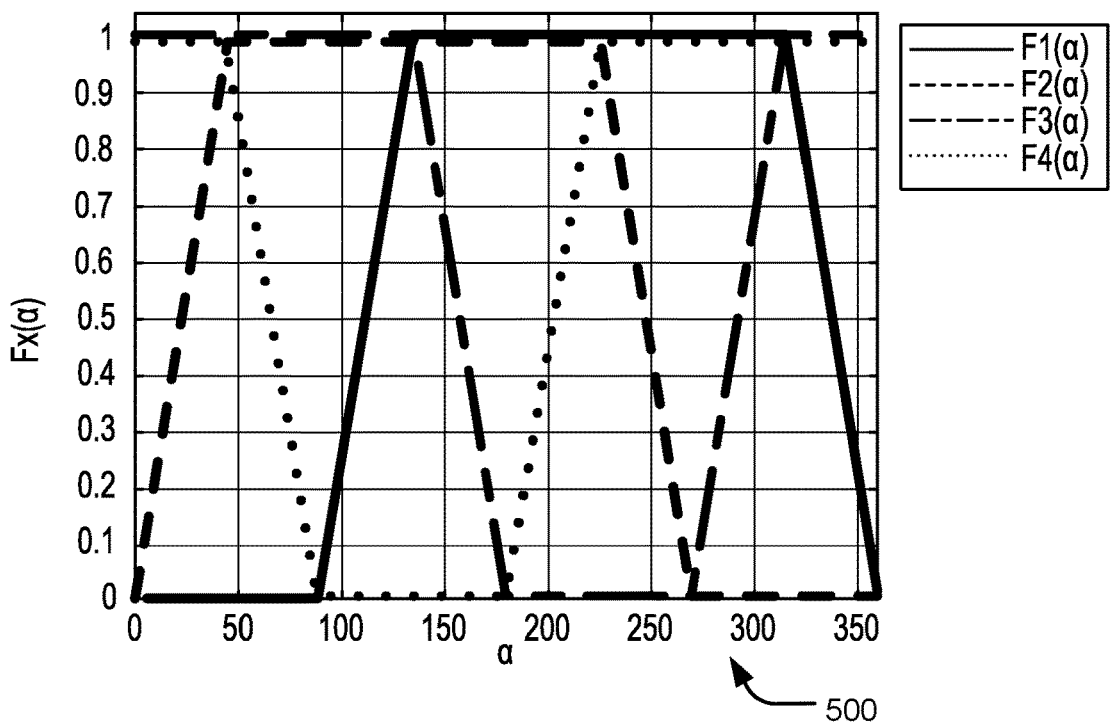
FIG. 5 illustrates an example of overlayed flap insertion functions of a plurality of steering flaps for controlling a vehicle.

FIG. 5 illustrates an example of function 500 for four flaps 110 offset by their flap location around the duct 108. The function may be F($\alpha+\delta_x$) for x={1, 2, 3, 4}.

A visual representation of each of the four flap maps F1(a)-F4(a) are shown on the same graph. For example, to vector the thrust towards 0°, Flap 3 and Flap 4 can be inserted an equal amount while Flap 1 and Flap 2 are at the $i_{start}$ position which is 0 in this graph. To angle the thrust towards 45°, Flap 2, Flap 3 and Flap 4 can be inserted an equal amount while flap 1 is at the $i_{start}$ position. To angle the thrust towards 67.5°, Flap 2, Flap 3 can be inserted equally while Flap 4 is inserted less than Flap 2 and Flap 3 while Flap 1 is at the $i_{start}$ position. In the example, $i_{start}$ is at 0.

In some instances, the vehicle 102 uses different flap insertion profiles for thrust vectoring in AV mode 112 (flight) versus GV mode 114 (ground). For example, during flight, to travel in a 0° heading, Flap 3 and Flap 4 may be deployed. On the ground, to travel in a 0° heading, Flap 1 and Flap 2 must be deployed. To transition between the different operation modes, the direction of the thrust vector may be reversed. In other words, a first flap insertion profile for the aerial transportation mode 112 may be an opposite or inverted profile relative to a second flap insertion profile for the ground transportation mode 114. In some instances, associating directions with flap insertion amounts/profiles is a computationally efficient way to control the direction of the vehicle 102, such that the control system can maintain and/or change directional control of the vehicle 102.

Figure 6B:
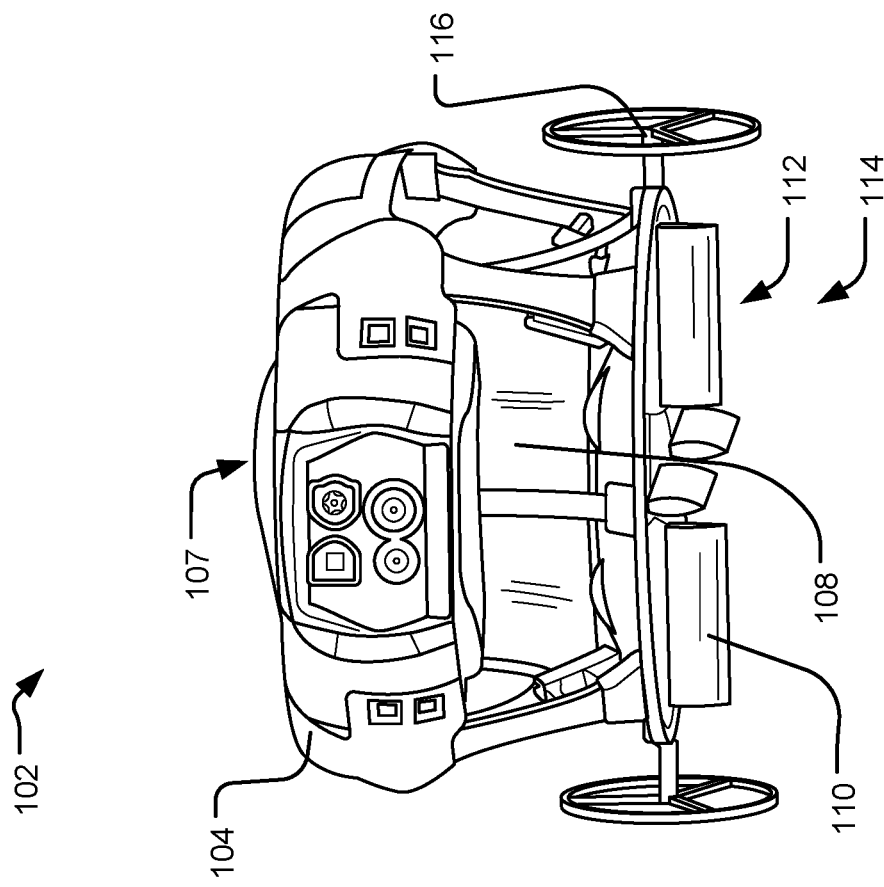
FIG. 6B illustrates a front elevation view of an example system including a vehicle with one or more steering flaps below a tapered duct and one or more wheels.
Figure 6A:
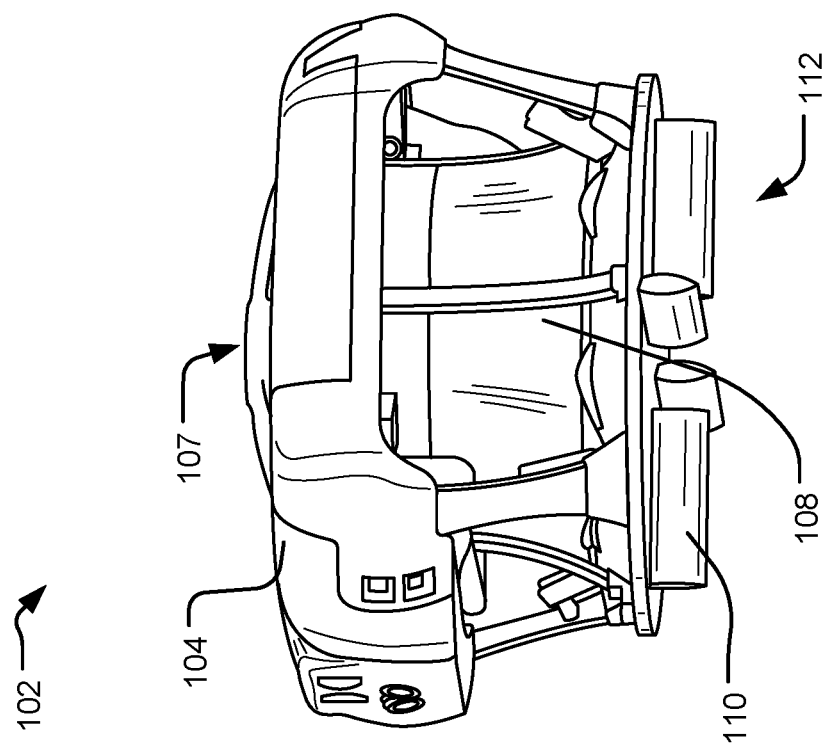
FIG. 6A illustrates a side elevation view of an example system including a vehicle with one or more steering flaps below a tapered duct.

FIGS. 6A and 6B illustrate an example system including an unmanned vehicle 102 with one or more steering flaps 110 below a tapered duct 108. The system depicted in FIGS. 6A and 6B can be combined with and/or form a portion of any of the systems disclosed above regarding FIGS. 1-5. FIG. 6A illustrates an example of the vehicle 102 as an aerial vehicle (e.g., omitting the wheels) and FIG. 6B illustrates an example of the vehicle 102 as an aerial and/or ground vehicle, with the wheels, which can transition between the different transportation modes.

In some examples, the vehicle 102 can include the flaps 110 extending from a bottom of the vehicle 102, such as extending below a bottom frame portion of the vehicle 102. For instance, the flaps 110 can include one, two, three, four, five, six, etc. flaps 110 that can swing (e.g., using a controllable hinge) between a vertical position and one or more angled positions. The vehicle 102 can include four flaps 110 extending from its bottom in a "plus-sign" or cross pattern arrangement, with the four flaps 110 arranged in two sets along two lines that are perpendicular (e.g., with a center space between the flaps 110). Furthermore, in some scenarios, the wheels may elevate the vehicle 102 a distance above the ground (e.g., in the ground transportation mode 114, such that a gap is formed between the bottom of the vehicle 102 and the ground. The flaps 110 may extend downward into the gap and can have a length shorter than the gap between the bottom of the vehicle 102 and the ground such that the flaps 110 have clearance to move (e.g., rotate or swing) in one or more multiple directions without contacting the ground. In this way, the flaps 110 extending from the bottom of the vehicle 102 can provide horizontal directional control while the vehicle 102 is airborne and/or traveling on the ground.

FIG. 7 illustrates an example method of controlling a vehicle 102, which can form and/or be performed by any of the systems disclosed above regarding FIGS. 1-6.

In some instances, at a first operation, the method includes positioning first one or more flaps at a first flap distance relative to a central axis of a ducted air pathway of the vehicle, the first flap distance corresponding to an aerial transportation mode 112 such that a first thrust is generated in a first direction by the first one or more flaps when the vehicle is in the aerial transportation mode 112. At a second operation, the method can transition between the aerial transportation mode and a ground transportation mode 114 (e.g., by landing on a surface such as a ground surface). At a third operation, the method can position second one or more flaps at a second flap distance relative to the central axis of the ducted air pathway, the second flap distance corresponding to the ground transportation mode 114 such that a second thrust is generated in a second direction by the second one or more flaps when the vehicle is in the ground transportation mode 114. In some examples, the first direction is a same direction as the second direction; the first flap distance is part of a first arrangement of four flaps; and/or the second flap distance is part of a second arrangement of the four flaps that is an inverted configuration relative to the first arrangement of the four flaps.

The various disclosed mechanisms for vectoring the thrust can apply to any AV that uses thrust vectoring regardless of the mechanism it utilizes. While the presently disclosed technology has been described with reference to various implementations, it will be understood that these implementations are illustrative and that the scope of the presently disclosed technology is not limited to them. Many variations, modifications, additions, and improvements are possible. More generally, implementations in accordance with the presently disclosed technology have been described in the context of particular implementations. Functionality may be separated or combined differently in various implementations of the disclosure or described with different terminology. These and other variations, modifications, additions, and improvements may fall within the scope of the disclosure as defined in the claims that follow.

The invention claimed is:

1. A vehicle comprising:
a duct defining a ducted air pathway with a central axis;
one or more propellers configured to move air along the ducted air pathway; and
one or more flaps disposed around the ducted air pathway and movable between a plurality of positions that vary a distance between one or more termination ends of the one or more flaps and the central axis, the one or more flaps providing horizontal directional control for the vehicle in a first transportation mode comprising a flight mode and a second transportation mode comprising a drive mode, wherein the horizontal directional control for the vehicle during the second transportation mode maintains the vehicle on a ground surface.

2. The vehicle of claim 1, wherein:
the first transportation mode includes three-dimensional control by the one or more propellers and the one or more flaps; and
the second transportation mode includes two-dimensional control by the one or more propellers and the one or more flaps.

3. The vehicle of claim 2, wherein the three-dimensional control includes a first flap position corresponding to a forward direction.

4. The vehicle of claim 3, wherein the two-dimensional control includes a second flap position corresponding to the forward direction, the second flap position being an opposite position relative to the first flap position for the three-dimensional control.

5. The vehicle of claim 1, further comprising:
one or more wheels arranged around a bottom portion of a chassis for providing at least one of horizontal ground or surface mobility in the second transportation mode.

6. The vehicle of claim 5, wherein the duct is connected to the chassis and the one or more flaps are positioned along the bottom portion.

7. The vehicle of claim 6, wherein the one or more flaps are a plurality of flaps that are evenly spaced apart around the chassis.

8. The vehicle of any of claim 1, further comprising:
one or more processors; and
a storage device storing computer-readable instructions that, when executed by the one or more processors, cause the vehicle to:
move a first flap and a second flap of the one or more flaps toward the central axis to generate a first thrust at least partially along a horizontal direction;
transition between the first transportation mode and the second transportation mode; and
move a third flap and a fourth flap of the one or more flaps toward the central axis to generate a second thrust at least partially along the horizontal direction.

9. The vehicle of claim 8, wherein the computer-readable instructions, when executed by the one or more processors, further cause the vehicle to:
retract the first flap and the second flap away from the central axis to generate the second thrust.

10. The vehicle of claim 8, wherein generating the second thrust is responsive to determining a location of a charging station associated with the vehicle.

11. A method of controlling a vehicle, the method comprising:
positioning a first set of one or more flaps at a first flap distance relative to a central axis of a ducted air pathway of the vehicle, the first flap distance corresponding to an aerial transportation mode, such that a first thrust is generated in a first direction by the first set of one or more flaps when the vehicle is in the aerial transportation mode;
transitioning between the aerial transportation mode and a ground transportation mode; and
positioning a second set of one or more flaps at a second flap distance relative to the central axis of the ducted air pathway, the second flap distance corresponding to the ground transportation mode, such that a second thrust is generated in a second direction by the second set of one or more flaps when the vehicle is in the ground transportation mode and maintains the vehicle on a ground surface during the ground transportation mode.

12. The vehicle of claim 11, wherein:
the first direction is a same direction as the second direction;
the first flap distance is part of a first arrangement of four flaps; and the second flap distance is part of a second arrangement of the four flaps that is an inverted configuration relative to the first arrangement of the four flaps.

13. A vehicle comprising:
a duct defining a ducted air pathway with a central axis;
one or more propellers arranged to move air through the ducted air pathway;
a bottom chassis portion; and
one or more flaps extending from the bottom chassis portion and movable between a plurality of positions that vary an angle formed by the one or more flaps, the one or more flaps providing directional control for the vehicle in a first transportation mode comprising a flight mode and a second transportation mode comprising a drive mode, wherein the directional control for the vehicle during the second transportation mode maintains the vehicle on a ground surface.

14. The vehicle of claim 13, wherein the one or more flaps includes four flaps diametrically opposed to each other about a center space.

15. The vehicle of claim 13, further comprising:
one or more wheels coupled to the bottom chassis portion.

16. The vehicle of claim 15, wherein:
the first transportation mode is an aerial mode using the one or more flaps for horizontal navigation control; and
the second transportation mode is a ground mode using the one or more flaps and the one or more wheels for the horizontal navigation control.

17. The vehicle of claim 15, wherein the one or more wheels elevate the vehicle from the ground surface when the vehicle is in the second transportation mode, such that a gap is formed between the bottom chassis portion and the ground surface.

18. The vehicle of claim 17, wherein:
the gap has a vertical distance; and
the one or more flaps extend downward a distance that is less than the vertical distance of the gap.

19. The vehicle of claim 13, wherein the one or more flaps are rotatably coupled to the bottom chassis portion.

* * * * *